United States Patent
Li et al.

(10) Patent No.: US 11,180,369 B2
(45) Date of Patent: Nov. 23, 2021

(54) RENEWABLE MAGNESIUM REMOVING AGENT AND ITS USE IN PREPARATION OF LOW-MAGNESIUM LITHIUM-RICH BRINE

(71) Applicant: QINGHAI INSTITUTE OF SALT LAKES, CHINESE ACADEMY OF SCIENCES, Xining (CN)

(72) Inventors: Dongdong Li, Xining (CN); Wu Li, Xining (CN); Yaping Dong, Xining (CN); Dandan Gao, Xining (CN)

(73) Assignee: QINGHAI INSTITUTE OF SALT LAKES, CHINESE, ACADEMY OF SCIENCES, Qinghai (CN)

( * ) Notice: Subject to any disclaimer, the term of this patent is extended or adjusted under 35 U.S.C. 154(b) by 0 days.

(21) Appl. No.: 17/059,261

(22) PCT Filed: Nov. 8, 2019

(86) PCT No.: PCT/CN2019/116624
§ 371 (c)(1),
(2) Date: Nov. 27, 2020

(87) PCT Pub. No.: WO2021/017264
PCT Pub. Date: Feb. 4, 2021

(65) Prior Publication Data
US 2021/0246025 A1    Aug. 12, 2021

(30) Foreign Application Priority Data
Jul. 30, 2019 (CN) .......................... 201910694585.4

(51) Int. Cl.
| | |
|---|---|
| *C01B 25/34* | (2006.01) |
| *C01D 15/04* | (2006.01) |
| *C01D 3/06* | (2006.01) |
| *C01D 3/16* | (2006.01) |
| *C01F 5/30* | (2006.01) |

(52) U.S. Cl.
CPC .............. *C01B 25/34* (2013.01); *C01D 3/06* (2013.01); *C01D 3/16* (2013.01); *C01D 15/04* (2013.01); *C01F 5/305* (2013.01)

(58) Field of Classification Search
CPC .............. C01B 25/34; C01D 3/06; C01D 3/16
See application file for complete search history.

(56) References Cited

U.S. PATENT DOCUMENTS

| | | | |
|---|---|---|---|
| 4,477,355 A * | 10/1984 | Liberti ............... | B01J 49/08 210/665 |
| 5,645,322 A | 7/1997 | Hsu et al. | |
| 7,157,065 B2 | 1/2007 | Boryta et al. | |
| 2019/0169038 A1 * | 6/2019 | Stanton ............... | C01F 5/22 |

FOREIGN PATENT DOCUMENTS

| | | |
|---|---|---|
| CN | 1141263 A | 1/1997 |
| CN | 1172072 A | 2/1998 |
| CN | 1335262 A | 2/2002 |
| CN | 1274855 C | 9/2006 |
| CN | 101538057 A | 9/2009 |
| CN | 101870461 A | 10/2010 |
| CN | 102417169 A | 4/2012 |
| CN | 102491378 B | 2/2013 |
| CN | 103038170 A | 4/2013 |
| CN | 103449479 A | 12/2013 |
| CN | 102602966 B | 1/2014 |
| CN | 103553088 B | 6/2015 |
| CN | 105253903 A | 1/2016 |
| CN | 107879321 A | 4/2018 |
| CN | 110372014 A | 10/2019 |
| WO | 2011138389 A1 | 11/2011 |

OTHER PUBLICATIONS

Jeon Woong An, et al. Recovery of lithium from Uyuni salar brine, Hydrometallurgy 117-118, 2012, pp. 64-70.
Shaoju Bian, et al., Hydrometallurgical processing of lithium, potassium, and boron for the comprehensive utilization of Da Qaidam lake brine via natural evaporation and freezing, Hydrometallurgy, 2017, pp. 80-83, 173.
Jiaoyu Peng, et al., Research on boron recovery from sulfate-type saline lakes with a novel dilution method, Hydrometallurgy, 2017, pp. 47-55, 174.
A. H. Hamzaoui, et al., Contribution to the lithium recovery from brine, Desalination, 2003, pp. 221-224, 158.
Lihua He, et al., Selective removal of magnesium from a lithium-concentrated anolyte by magnesium ammonium phosphate precipitation, Separation and Purification Technology, 2017, pp. 214-220, vol. 187.

(Continued)

*Primary Examiner* — Ngoc-Yen Nguyen
(74) *Attorney, Agent, or Firm* — Bayramoglu Law Offices LLC

(57) ABSTRACT

A renewable magnesium removing agent and its use in a preparation of a low-magnesium lithium-rich brine are provided. The magnesium removing agent includes a magnesium phosphate double salt of an alkali metal or ammonium. A regeneration of the magnesium removing agent is realized by adding the magnesium removing agent into $Mg^{2+}$-containing chloride salt solution, wherein $Mg^{2+}$ in the chloride salt solution and the magnesium removing agent are subjected to a magnesium removing reaction to form a solid-phase reaction product and carrying out a solid-liquid separation on an obtained mixed reaction product after the magnesium removing reaction is ended to separate the solid-phase material comprising a magnesium phosphate hydrate and then separating out a chlorine salt of the alkali metal or the ammonium from a remaining liquid-phase material, and finally carrying out a regeneration reaction on the magnesium phosphate hydrate and the chlorine salt of the alkali metal or the ammonium.

18 Claims, No Drawings

(56) References Cited

OTHER PUBLICATIONS

Cheng Bobo, et al., Method of separating MgCl2 from LiCl-containing natural brine via high-temperature Vaporization and crystallization, Inorganic Chemicals Industry, 2008, pp. 38-55 vol. 40.

Zhang Li-Fen, et al., Technique for Separating Magnesium and Lithium from Salt Lake Brine with High Mg/Li Ratio, Mining And Metallurgical Engineering, 2016, pp. 83-87, vol. 36 No.4.

Chen Guoxuan, et al., Design and installation of pilot test equipment to rapidly reduce the ratio of old brine magnesium lithium, Chemical Engineering and Equipment, 2011, pp. 83-85 No. 9.

You-Li Wu, Study on process of magnesium impurities removal from phosphate rock with phosphoric acid by chemical extraction, IM&P Chemical Minerals and Processing, 2015, pp. 13-17, 1008-7524.

Shichang Ma, Dictionary of Chemicals, 1999, pp. 916, Sha'anxi Science and Technology Press.

\* cited by examiner

RENEWABLE MAGNESIUM REMOVING AGENT AND ITS USE IN PREPARATION OF LOW-MAGNESIUM LITHIUM-RICH BRINE

CROSS REFERENCE TO THE RELATED APPLICATIONS

This application is the national stage entry of International Application No. PCT/CN2019/116624, filed on Nov. 8, 2019, which is based upon and claims priority to Chinese Patent Application No. 201910694585.4, filed on Jul. 30, 2019, the entire contents of which are incorporated herein by reference.

TECHNICAL FIELD

The disclosure relates to a magnesium removing agent, and particularly to a renewable magnesium removing agent and its use in preparation of low-magnesium lithium-rich brine.

BACKGROUND

Lithium is the most important energy metal in the $21^{st}$ century. The rapid development of new energy vehicles represented by lithium battery makes the global demand for lithium resources surge. Lithium resources are mainly divided into ore type and brine type. Among them, salt lake brine lithium resources account for 70% of the total lithium reserves in the world. As solid lithium resources are increasingly depleted, extraction of lithium from salt lake brine will become a main source of basic lithium products.

There are abundant water-soluble lithium resources in the dry or partially dry salt lakes in the "lithium triangle" area of South America and the Qinghai Tibet Plateau of China. Most of them contain $Na^+$, $K^+$, $Mg^{2+}$, $SO_4^{2-}$, and $Cl^-$ multiple borate ions. The concentration of $Li^+$ is mostly between 0.2 and 4.0 g/L, which exists as a trace or semi-trace component. Other components such as $Na^+$, $K^+$, $Mg^{2+}$, $SO_4^{2-}$ and $Cl^-$ can reach several to dozens g/L, which exist as a large number of components.

Removing other components in brine and meanwhile enriching lithium is a key to extracting lithium from salt lake brine. Through the forced concentration in the salt field or evaporation equipment under natural conditions, a large amount of $Na^+$, $K^+$, $Mg^{2+}$, $Li^+$, $SO_4^{2-}$, $Cl^-$ and other components in brine can be effectively removed. These components are precipitated out in forms of sodium chloride, potassium chloride, mirabilite, potassium mirabilite, magnesium sulfate, potassium jarosite, carnallite and the like. In this process, brine can be concentrated to a large extent, and meanwhile lithium concentration is significantly increased. Due to the maximum solubility of LiCl and $MgCl_2$ in brine, concentrated brine usually contains a large amount of $MgCl_2$ and a small amount of LiCl. In addition, due to the influence of brine composition and ambient temperature, lithium may also be precipitated in the form of solid ($Li_2SO_4 \cdot H_2O$, $LiKSO_4$, lithium carnallite and the like) or solid solution in the process of brine concentration, resulting in the loss of lithium. Therefore, on the premise of ensuring that the lithium salt does not precipitate in the process of brine concentration, when the magnesium in the brine reaches a certain concentration, the effective removal of magnesium in the brine has become a primary problem which must be solved in almost all salt lake brines for lithium extraction.

So far, many methods for separating magnesium and lithium from brine by precipitation of magnesium have been proposed.

(1) Removal of magnesium via an alkali method: sodium hydroxide or sodium carbonate is used as a precipitant to precipitate out magnesium in brine in a form of insoluble magnesium compound magnesium hydroxide or magnesium carbonate, so as to obtain brine having a low magnesium-lithium ratio. However, the precipitate produced by such the method has poor crystallinity and is difficult to filter. The mother liquor entrainment amount is large and lithium loss is serious. As an improved method, CN101538057A uses sodium hydroxide as a magnesium removing agent. By adding the organic precipitation crystallization control agent, the filtering performance of the precipitate magnesium hydroxide is improved, and high magnesium removing rate and lithium recovery rate are obtained. However, this method needs to add a certain amount of organic additives to improve the filterability of the precipitate. The dissolution of these substances in brine can cause serious containment of brine, precipitate magnesium hydroxide and environment. At the same time, this method still needs to consume a large amount of sodium hydroxide raw material, and the brine needs to be raised to a higher temperature, so far there is no report about industrial application.

(2) Removal of magnesium via an ammonia method: ammonia or ammonia water is used as a precipitant to react it with salt lake brine having a high magnesium-lithium ratio, so that magnesium is removed from brine in the form of magnesium hydroxide precipitate. Generally, this method can obtain the precipitate having a good crystalline morphology, thereby reducing the entrainment or adsorption loss of lithium. CN1274855C uses ammonia and ammonium bicarbonate two-stage precipitation method to achieve the effective separation of magnesium and lithium. The reaction is carried out at room temperature. After that, the separation of ammonium chloride and lithium chloride in brine is realized by evaporation, concentration and fractional crystallization. The low-magnesium lithium-rich brine is obtained. The ammonia recycling of a magnesium precipitating agent is realized by the reaction of ammonium chloride and lime. However, due to the strong volatility of ammonia water, this method is bad in operation environment, a lot of byproducts magnesium hydroxide and calcium chloride are produced while a large amount of lime is consumed, and the energy consumption of ammonia recovery is high.

(3) Simultaneous removal of magnesium and sulfate radicals via a lime milk method: quicklime and water react to prepare lime milk, then lime milk reacts with raw brine so that magnesium in brine generates magnesium hydroxide precipitate, and meanwhile sulfate radical interacts with calcium to form calcium sulfate. The lime milk is cheap and available, and has a high magnesium removing rate. For low magnesium-lithium ratio salt lake brine such as Chile Atacama Salt Lake, lithium extraction has been used in industry [see U.S. Pat. No. 7,157,065B; J. W. An et al., hydrometallurgy, 117-118 (2012): 64-70]. However, when precipitating magnesium, this method requires a low magnesium concentration, a large brine treatment amount, and the formed magnesium hydroxide and calcium sulfate mixed precipitate is difficult to filter, which adsorbs a large amount of boron and lithium, resulting in a great loss of lithium and generation of mixed slag difficult to utilize while consuming a large amount of lime. Furthermore, lithium in the slag is difficultly recovered through simple washing.

(4) Removal of magnesium via boron and magnesium co-precipitation: CN1335262A discloses a method for separating lithium, magnesium and boron from salt lake brine having a high Mg/Li ratio. Firstly, a large amount of sodium salts and potassium and magnesium mixed salts are removed by evaporation of a salt field, and then magnesium and boron in brine are precipitated simultaneously by adding precipitants such as hydroxide, carbonate, oxalate, ammonia water and carbon dioxide. By using this method, the precipitates are mostly colloids, and the amount of precipitates is large, so it is difficult to filter, resulting in a fact that lots of lithium are lost in the precipitate, and difficultly washed and recovered. At the same time, when this method is used in salt lake brine with a high Mg/Li ratio, a large amount of magnesium precipitants are still needed to be consumed, and the byproduct boron and magnesium precipitates are difficult to use. In addition, a method for obtaining magnesium borate precipitate by adding water to dilute boron-rich magnesium-rich old brine is reported in References [S. J. Bian et al., hydrometallurgy, 173 (2017), 80-83] and [J. Y Peng et al., hydrometallurgy, 174 (2017), 47-55]. This method can remove a part of magnesium in brine, but the magnesium removing rate is extremely limited due to too high magnesium/boron ratio in brine.

(5) Removal of magnesium via oxalate precipitation: considering that oxalate and magnesium can form insoluble magnesium oxalate precipitate, magnesium in brine has also been proposed to precipitate in the form of oxalate [A. H. hamzaoui et al., desalination, 158 (2003), 221-224; J. W an et al., hydrometallurgy, 117-118 (2012): 64-70]. This method is suitable for deep magnesium removal in brine with a low Mg/Li ratio, but the cost of oxalate magnesium precipitant for medium and high Mg/Li ratio brine is very high. In addition, although the solubility difference between magnesium oxalate and lithium oxalate is theoretically very large, and lithium does not form a precipitate, but in fact, when the ratio of lithium to magnesium is high, there is a certain amount of lithium cocrystals, and the lithium yield can only reach 70%-80%.

(6) Removal of magnesium via phosphate precipitation: in the pre-research work of literature [J. W. an et al., hydrometallurgy, 117-118 (2012): 64-70], it is mentioned that phosphate radical reacts with magnesium in brine to form insoluble magnesium phosphate precipitate, so as to realize the separation of magnesium and lithium from brine, and meanwhile produce a high-quality phosphate magnesium fertilizer. However, it is difficult to obtain ideal magnesium removal effect only by using this method. Even if the $PO_4/Mg$ molar ratio is greater than 2, the concentration of magnesium in the magnesium removal brine is still about 4 g/L. [L. H. He et al., Separation and Purification Technology, 187 (2017), 214-220] reported a method for removing magnesium and lithium in brine (a Mg/Li mass ratio is 4) in the form of magnesium ammonium phosphate by adding $(NH_4)_3PO_4$ in brine. The magnesium removing effect of this method is greatly improved compared with a magnesium phosphate method, the concentration of magnesium in the magnesium removing brine can be as low as 11 mg/L, and the formed ammonium magnesium phosphate precipitate has excellent filtering performance and high lithium yield. However, due to the large consumption of expensive triammonium phosphate, the cost of this method for magnesium removal from medium and high Mg/Li brine is very high, and it may lead to high concentration of phosphorus remnant in brine. However, when the foregoing these methods are applied to the treatment of brine with high Mg/Li ratio, there are some problems of a large amount of precipitants, high magnesium removal cost, and large restriction of byproducts by market demand.

(7) Removal of magnesium via evaporation of bischofite: CN1141263A and U.S. Pat. No. 5,645,322B have published a method for removing magnesium and meanwhile enriching lithium through evaporation of brucite for many times, which is also known as "Xu's method". The experimental results of this method are also reported in the literature [Cheng Bo et al., Inorganic Salt Industry, 40 (2008), 38-55]. Even for the brine with high Mg/Li ratio, the mg/Li ratio can be effectively reduced by repeatedly evaporating bischofite. However, due to the high enrichment of brine, high concentration, high viscosity, repeated heating-evaporation-cooling-salt precipitation-filtration, the loss of lithium is too large, and the total recovery rate of lithium is only 2-30%.

(8) Removal of magnesium from carbonate and sulfate brines by dilution: CN102491378B and CN103553088B have disclosed a method for removing magnesium from brine by diluting carbonate and sulfate magnesium-rich brine. This method is essentially an alkaline method for magnesium removal, with a good magnesium removing effect and a high lithium yield. However, the implementation of this method is completely constrained by the geographical location of salt lakes and the chemical characteristics of brine. Such resource distribution is extremely rare and cannot be copied.

(9) Cyclic removal of magnesium from mirabilite: CN 1172072A and literature [S. J. Bian et al., Hydrometatherapy, 173 (2017), 80-83] disclosed a method for removing magnesium by mirabilite. In this method, mirabilite is added to the old magnesium-rich old brine, so that magnesium and sodium chloride are simultaneously precipitated out in a form of magnesium sulfate or magnesium sulfate double salt. In winter, the mixture of magnesium sulfate and sodium chloride can be dissolved and frozen to recover mirabilite, so as to realize the cycling of magnesium removal by mirabilite. However, this method has low efficiency, high operation requirements, complex process and serious seasonal influence. Most importantly, a huge amount of magnesium sulfate and sodium chloride mixed salt is produced, mother liquor entrainment causes serious lithium loss, and the lithium yield is only 10%-30%, and the comprehensive recovery of lithium cannot be improved by simple washing.

(10) Cyclic removal of magnesium from carnallite: international patents WO2011/138389A and CN103038170A disclose a method for removing magnesium by adding potassium chloride to the magnesium-rich old brine after removing sulfate and boron, and forming carnallite via high temperature evaporation. All the raw materials used in this method come from the salt lake itself, and a magnesium removing agent potassium chloride is easily recovered and recycled. The practical application of this method is also reported in the literature [Zhang Lifen et al., mining and Metallurgy Engineering, 36 (2016), 83-87]. In addition to potassium chloride, ammonium chloride can also react with magnesium-rich brine to produce ammonium carnallite, thus achieving the magnesium removing effect, and ammonium chloride is recovered by using a similar method to achieve cyclic utilization of the magnesium removing agent [Chen GuoXuan, chemical engineering and equipment, 9 (2011), 83-85]. However, such the method usually needs to add potassium chloride or ammonium chloride in the form of saturated solution. The magnesium removal effect is better by forced evaporation cooling cycle at high temperature, and the process energy consumption is high. If the magnesium removing agent is added in a solid form, the reaction is difficult to complete, and the effect of removing magnesium is not ideal. In addition, this method will cause lithium loss in carnallite, which is the product of magnesium, in the form of mother liquor or solid solution. With the increase of the ratio of lithium to magnesium, the loss of lithium will be increased greatly. The loss of washing will cause dissolution of a large amount of magnesium when washing the lithium in carnallite. This part of lithium can not be effectively recovered.

(11) Cyclic removal of magnesium via an organic precipitant: CN102602966B discloses a method for realizing cyclic removal of magnesium in brine by using an organic precipitant. In this method, the organic precipitant and magnesium chloride are used to form insoluble compounds, thus realizing the separation of magnesium and lithium. The composite filter cake is heated to vaporize the precipitant, so as to realize the recovery and reuse of the precipitant. The precipitated magnesium products obtained by this method are easy to wash and the total recovery of lithium is high. However, the solubility of magnesium precipitant in brine is high, and the part of lithium rich brine after magnesium removal is difficultly effectively recovered, and the energy consumption of organic precipitant for precipitation species is very high. Some organic precipitators are toxic and have poor operation conditions.

Obviously, most of the existing magnesium removal methods need to consume a lot of magnesium precipitates, including sodium hydroxide, sodium carbonate, ammonia, lime milk, oxalate, bisphosphate and orthophosphate. In addition, most of the magnesium precipitates have poor crystalline morphology, a large amount of mother liquor entrainment and lithium ion adsorption, and a low lithium recovery rate. In addition, a large number of insoluble magnesium salt produced contain a large number of impurity ions, which are difficult to use, and the market demand is small, so it becomes waste slag. Therefore, these existing methods can only be used to extract lithium from brine with very low Mg/Li ratio (Mg/Li weight ratio is <6).

SUMMARY

It is a main object of the present application to provide a renewable magnesium removing agent and use thereof in preparation of low-magnesium lithium-rich brine, so as to overcome the defects in the prior art.

In order to achieve the object of the foregoing disclosure, the technical solution adopted by the present application comprises:

An embodiment of the present application firstly provides use of magnesium phosphate double salt of alkali metal or ammonium as a magnesium removing agent.

Wherein, the alkali metal comprises potassium (K) and/or sodium (Na).

Further, the use comprises: at least adding the magnesium phosphate double salt into $Mg^{2+}$-containing chloride salt solution so that at least a portion of $Mg^{2+}$ in the solution is subjected to magnesium removing reaction with the magnesium phosphate double salt to form a solid-phase reaction product.

An embodiment of the present application also provides a method for removing magnesium from chloride salt solution, comprising: providing a magnesium removing agent into $Mg^{2+}$-containing chloride salt solution, wherein the magnesium removing agent comprises the magnesium phosphate double salt of alkali metal or ammonium so that at least a portion of $Mg^{2+}$ in the solution and the magnesium phosphate double salt undergo magnesium removing reaction to form a solid-phase reaction product.

Further, the method also comprises: carrying out solid-liquid separation on the obtained mixed reaction product after the magnesium removing reaction is ended to separate the solid-phase material comprising magnesium phosphate hydrate and then separating out chlorine salt of alkali metal or ammonium from the remaining liquid-phase material.

More further, the method also comprises: carrying out regeneration reaction on the solid-phase reaction product and the chlorine salt of alkali metal or ammonium, thereby achieving the regeneration of the magnesium phosphate double salt.

An embodiment of the present application also provides a method for preparing low-magnesium lithium-rich brine, comprising:

providing a first solution, the first solution being chloride salt solution, and the first solution at least containing $Mg^{2+}$ and $Li^+$;

adding a magnesium removing agent into the first solution, the magnesium removing agent comprising magnesium phosphate double salt of alkali metal or ammonium, so that at least a portion of $Mg^{2+}$ and the magnesium phosphate double salt undergo magnesium removing reaction to form a solid-phase reaction product; and carrying out solid-liquid separation on the obtained mixed reaction product after the magnesium removing reaction is ended.

Further, the method also comprises:

obtaining a solid-phase material and a liquid-phase material after the solid-liquid separation is finished, wherein the solid-phase material comprises the solid-phase reaction product which comprises magnesium phosphate hydrate, and the liquid-phase material is a second solution;

separating the chlorine salt of alkali metal or ammonium from the second solution; and carrying regeneration reaction on the solid-phase reaction product and the chlorine salt of alkali metal or ammonium, thereby achieving the regeneration of the magnesium phosphate double salt.

Compared with the prior art, the present application at least has the following advantages: by using magnesium phosphate double salt (for example, ammonium magnesium phosphate or sodium magnesium phosphate) as the magnesium removing agent, it plays a role in "catalyst" in the cyclic process of magnesium removal in brine. Except for a small amount of solution loss, there is no significant reaction consumption in the whole magnesium removal process, that is, there is no need to additionally introduce the magnesium removing agent into brine, and the obtained magnesium precipitate can be regenerated into the magnesium removing agent for recycling, so that the process of magnesium removal from brine can not only avoid impurities, but also avoid reduced recovery rate due to adsorption and entrainment of lithium ions. Therefore, the present application can reduce the magnesium-lithium ratio of high-magnesium brine to be 2 or less, and meanwhile lithium-rich brine with a lithium concentration of 10-30 g/L is obtained, and the comprehensive recovery rate of lithium is as high as 50%-90%.

DETAILED DESCRIPTION OF THE EMBODIMENTS

For making the objective, technical solution and advantages of the present application more clear, the present application will be described in detail by combining with embodiments. It should be understood that embodiments described here are only for explaining the present application but not intended to limit the present application.

An aspect of the present application firstly provides use of magnesium phosphate double salt of alkali metal or ammonium as a magnesium removing agent.

Further, the magnesium removing agent is renewable.

Further, the alkali metal comprises potassium (K) and/or sodium (Na). The magnesium phosphate double salt comprises but is not limited to a combination of any one or more of ammonium magnesium phosphate, potassium magnesium phosphate, sodium potassium magnesium phosphate and ammonium magnesium phosphate, or solid solution of these compounds.

In some embodiments, the use comprises: adding the magnesium phosphate double salt into $Mg^{2+}$-containing chloride salt solution so that at least a portion of $Mg^{2+}$ in the solution and the magnesium phosphate double salt undergo magnesium removing reaction to form a solid-phase reaction product.

Preferably, the magnesium phosphate double salt and a crystal form control agent (for example $MgHPO_4 \cdot 3H_2O$, $Mg_3(PO_4)_2 \cdot 8H_2O$ or $Mg_3(PO_4)_2 \cdot 22H_2O$) are cooperatively used after being mixed. The crystal form control agent is 5 wt %-30 wt % of magnesium phosphate double salt and crystal form control agent. The crystal form control agent can improve the filtering performance of a magnesium phosphate solid-phase reaction product generated in magnesium removing reaction.

Further, the use can also comprises: carrying out solid-liquid separation on the obtained mixed reaction product after the magnesium removing reaction is ended, wherein the separated solid-phase material comprises the solid-phase reaction product which comprises magnesium phosphate hydrate, and then separating out chlorine salt of alkali metal or ammonium from the remaining liquid-phase material; and The solid-phase reaction product and the chlorine salt of alkali metal or ammonium are subjected to regeneration reaction, thereby realizing the regeneration of the magnesium phosphate double salt.

Wherein, through the magnesium removing reaction, the obtained products comprise magnesium phosphate hydrate as the solid-phase reaction product, and chlorine salt of alkali metal or ammonium, wherein the chlorine salt of alkali metal or ammonium is preserved in the solution.

Further, the solid-phase material can also be a mixture of magnesium phosphate hydrate and magnesium phosphate double salt.

Another aspect of an embodiment of the present application provides a method for removing magnesium from chloride salt solution, comprising: adding a magnesium removing agent into $Mg^{2+}$-containing chloride salt solution, the magnesium removing agent comprises magnesium phosphate double salt of alkali metal or ammonium so that at least a portion of $Mg^{2+}$ in the solution and the magnesium phosphate double salt undergo magnesium removing reaction to form a solid-phase reaction product.

In the specification, for magnesium phosphate double salt of alkali metal or ammonium or chlorine salt of ammonium, unless otherwise noted, the alkali metal elements contained therein are all selected from Na and/or K.

In the method according to an embodiment of the present application, the magnesium phosphate double salt at least has a function of the magnesium removing agent, which can be selected from a combination of one or more of ammonium magnesium phosphate, potassium magnesium phosphate, sodium potassium magnesium phosphate and sodium ammonium magnesium phosphate.

Further, the temperature of the magnesium removing reaction is 30-90° C.

Further, a weight ratio of the magnesium phosphate double salt to the chloride salt solution is preferably 0.1:1-1:1.

Further, the concentration of $Mg^{2+}$ in the chloride salt solution is preferably larger than or equal to 10 g/L.

Further, in some embodiments, the method can also comprises: carrying out solid-liquid separation on the obtained mixed reaction product after the magnesium removing reaction is ended, wherein the separated solid-phase material comprises the solid-phase reaction product comprising magnesium phosphate hydrate (for example tetrahydrate, octahydrate and 22 hydrate of $Mg_3(PO_4)_2$), and then separating out the chlorine salt (for example, sodium chloride, potassium chloride and ammonium chloride) of alkali metal or ammonium from the remaining liquid-phase material.

Further, the solid-phase material also comprises the unreacted magnesium phosphate double salt.

More further, in the above embodiment, the method can also comprise: carrying out regeneration reaction on the solid-phase reaction product and the chloride salt of alkali metal or ammonium, thereby achieving the regeneration of the magnesium phosphate double salt.

The mechanism of the regeneration reaction can refer to the following formula:

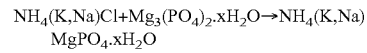

Preferably, the method specifically comprises: carrying out regeneration reaction on the solid-phase reaction product and the saturated solution of the chlorine salt of alkali metal or ammonium.

Wherein, the temperature of the regeneration reaction is preferably 0-25° C.

In the above embodiment, the used solid-liquid separation manner can be selected from but not limited to filtration, centrifugation, precipitation and the like, so that the solid-phase material is step by step or continuously taken out from the liquid-phase material.

In some embodiments of the present application, a method for enriching lithium and meanwhile removing magnesium from chloride salt solution comprises:

providing a chloride salt solution, wherein the concentration of $Mg^{2+}$ is ≥10 g/L, the concentration of $Li^+$ is ≥0.3 g/L, and the concentration of $Ca^{2+}$ is ≤1 g/L;

adding magnesium phosphate double salt of alkali metal or ammonium to the chloride salt solution in a dosage as a magnesium removing agent, at least partially reacting the magnesium removing agent with $Mg^{2+}$ in the solution to form a magnesium removing solid product (magnesium phosphate hydrate) so that $Mg^{2+}$ in the solution enters the solid phase, and meanwhile the alkali metal or ammonium ions in the magnesium phosphate double salt enter the solution, wherein the amount of the added magnesium phosphate double salt is set in the following manner: after the magnesium phosphate double salt is added to react with $Mg^{2+}$ in the solution, and the concentration of $Mg^{2+}$ in the remaining solution is ≥4 g/L.

Another aspect of the embodiment of the present application also provides a method for preparing low-magnesium lithium-rich brine, comprising:

providing a first solution, the first solution being chloride salt solution, and the first solution at least containing $Mg^{2+}$ and $Li^+$;

adding a magnesium removing agent into the first solution, the magnesium removing agent comprising magnesium phosphate double salt of alkali metal or ammonium, so that at least a portion of $Mg^{2+}$ and the magnesium phosphate double salt undergo magnesium removing reaction to form a solid-phase reaction product; and carrying out solid-liquid separation on the obtained mixed reaction product after the magnesium removing reaction is ended.

In some embodiments, the method also comprises:

obtaining a solid-phase material and a liquid-phase material after the solid-liquid separation is finished, wherein the solid-phase material comprises the solid-phase reaction product which comprises magnesium phosphate hydrate, and the liquid-phase material is a second solution; and separating the chlorine salt of alkali metal or ammonium from the second solution; and carrying out regeneration reaction on the solid-phase reaction product and the chlorine salt of alkali metal or ammonium, thereby achieving the regeneration of the magnesium phosphate double salt.

Wherein, the magnesium phosphate double salt can be selected from but is not limited to a combination of any one or more of ammonium magnesium phosphate, potassium magnesium phosphate, sodium potassium magnesium phosphate and sodium ammonium magnesium phosphate, or solid solution thereof.

Preferably, the magnesium removing agent can also be a mixture of the magnesium phosphate double salt and a crystal form control agent, wherein the content of the crystal form control agent is 5 wt %-30 wt %. The crystal form control agent comprises $MgHPO_4.3H_2O$, $Mg_3(PO_4)_2.8H_2O$ or $Mg_3(PO_4)_2.22H_2O$, but are not limited thereto.

In some embodiments, the method can specifically comprises: carrying out regeneration reaction on the solid-phase reaction product and the saturated solution of the chloride salt of the alkali metal or ammonium. Further, the temperature of the regeneration reaction is 0-25° C.

In some embodiments, the method can also comprises:

evaporating the separated second solution after the solid-liquid separation is finished so that the chlorine salt of alkali metal or ammonium therein is precipitated out and a third solution is obtained; and continuing to evaporate the third solution so that the carnallite in the solution is precipitated out and a fourth solution is obtained, thereby achieving removal of magnesium and enrichment of lithium.

Further, the method also comprises: after the solid-liquid separation is finished, washing the separated solid-phase material once or many times using washing liquid and collecting the used washing liquid and mixing with the second solution, and then evaporating to obtain the third solution; wherein the washing liquid comprises freshwater or diluted brine. Preferably, a weight ratio of the washing liquid to the solid-phase material is 5:1-1:1, and the washing temperature is 0-90° C.

More further, the method also comprises:

adding the magnesium phosphate double salt of alkali metal or ammonium in the fourth solution so that at least a portion of $Mg^{2+}$ and the magnesium phosphate double salt undergo magnesium removing reaction to form a solid-phase reaction product; and carrying out solid-liquid separation on the obtained mixed reaction product after the reaction is ended so as to obtain a solid-phase material and a fifth solution, further achieving removal of magnesium and enrichment of lithium.

In the above embodiment of the present application, the temperature of the magnesium removing reaction is preferably 30-90° C.

In the above embodiment of the present application, a weight ratio of the magnesium phosphate double salt to the chloride salt solution is 0.1:1-1:1.

In the above embodiment of the present application, preferably, in the chloride salt solution, the concentration of $Mg^{2+}$ is ≥10 g/L, the concentration of $Li^+$ is ≥0.3 g/L, and the concentration of $Ca^{2+}$ is ≤1 g/L.

More further, the method also comprises: cyclically carrying out the removal of magnesium and enrichment of lithium with the fifth solution as the first solution until low-magnesium lithium-rich brine is obtained, wherein in the low-magnesium lithium-rich brine, the concentration of $Mg^{2+}$ is 15-4 g/L, the concentration of $Li^+$ is 10-30 g/L, and a mass ratio of magnesium to lithium is 0.3-3:1.

In the above embodiment of the present application, various processes can be repeated, namely, the cycle of magnesium removal-evaporation-magnesium removal can be carried out for many times, and in the chloride salt solution, the concentration of $Mg^{2+}$ is reduced to 15-4 g/L, the concentration of $Li^+$ is increased to 10-30 g/L, and meanwhile a mass ratio of magnesium to lithium is 0.3-3, namely, low-magnesium lithium-rich bribe is obtained.

In some embodiments of the present application, the method also comprises: pretreating the original brine of a salt lake to form the first solution.

For example, the original brine of the salt lake is evaporated and concentrated until the concentration of $Mg^{2+}$ is 10 g/L-70 g/L and the concentration of $Li^+$ is 0.5 g/L-6 g/L to obtain the raw brine, and then the soluble calcium salt is added into the raw brine to remove sulfate ions and enrich magnesium ions to obtain the first solution. Wherein, the soluble calcium salt can be selected from calcium chloride or calcium hydroxide solution or the like, and is not limited to thereto.

In the above embodiment of the present application, the brine can be evaporated and concentrated by evaporation of salt field and other manners. Of course, the same objects can be achieved by using bribe concentration technologies such as forced evaporation process, electrodialysis or reverse osmosis.

For example, a more typical implementation mode of the embodiment of the present application may include the following steps:

(1) a high-magnesium brine $A_0$ (i.e., the first solution mentioned above) is provided, and the concentration of $Mg^{2+}$ in the high-magnesium brine $A_0$ is greater than or equal to 15 g/L. Sufficient or excessive magnesium phosphate double salt (such as ammonium magnesium phosphate, $NH_4MgPO_4.6H_2O$) is added into the high-magnesium brine $A_0$ to be reacted as a magnesium removing agent for reaction, and the solid-liquid separation is carried out after the reaction at the appropriate temperature for a set time to obtain magnesium removal brine $A_1$ and magnesium precipitate B1, the concentration of $Mg^{2+}$ in the magnesium removal brine $A_1$ is 4 g/L-15 g/L, and the concentration of $Li^+$ is within the range of 0.3 g/L-4 g/L.

The above high-magnesium brine $A_0$ can be prepared from the original brine of salt lake through pre-treatment processes such as evaporation concentration, sulfate radical removal, and the process operation and process conditions of these pretreatment can be known to those skilled in the art.

The magnesium removing agent being ammonium magnesium phosphate is taken as an example. After ammonium magnesium phosphate is added into high-magnesium brine $A_0$, the slurry is obtained when the weight ratio of solid to liquid is 0.1-1:1. The slurry is reacted at 30° C.-90° C. for 1-12 h, and then solid-liquid separation is carried out to obtain magnesium removal brine $A_1$ (namely, the above second solution) and magnesium precipitate B1. The obtained magnesium precipitate B1 is magnesium phosphate octahydrate, magnesium phosphate 22 hydrate, a mixture of magnesium phosphate octahydrate, magnesium phosphate 22 hydrate or and a mixture of magnesium phosphate octahydrate, magnesium phosphate 22 hydrate and magnesium ammonium phosphate.

(2) The magnesium precipitate B1 obtained in step (1) is washed with washing solution such as water or diluted brine, the solid-liquid weight ratio when washing is within the range of 1-4:1, the washing time is 0.5-3 h, and the used washing solution $A_2$ and magnesium precipitate B11 are obtained by solid-liquid separation.

(3) The used washing solution $A_2$ is mixed with the magnesium removal brine $A_1$ obtained in step (1) to obtain brine $A_3$. The brine $A_3$ is evaporated and concentrated until the chlorine salt of alkali metal or ammonium in the brine is precipitated out. After solid-liquid separation, low-magnesium lithium-rich brine $A_4$ and chlorine salt of solid alkali metal or ammonium are obtained (if the magnesium removing agent is sodium magnesium phosphate and magnesium ammonium phosphate, solid sodium chloride and solid ammonium chloride will be obtained here).

For example, brine $A_3$ can be evaporated to a concentration range of 40 g/L-50 g/L of $Mg^{2+}$, and a large amount of solid ammonium chloride is precipitated out in this process. The residual brine after ammonium chloride is precipitated out is brine $A_{31}$ (namely, the above third solution). The ammonium carnallite is precipitated out when the brine $A_{31}$ is continued to be evaporated to a concentration range of 80 g/L-100 g/L of $Mg^{2+}$. The residual brine after ammonium carnallite is precipitated out is brine $A_{32}$ (namely, the above fourth solution). The ratio of Mg to Li in the brine $A_{32}$ is ½-⅔ of the ratio of Mg to Li in $A_3$. The brine $A_{32}$ is diluted, when the concentration of magnesium ions is within the concentration range of magnesium ions in the raw brine A, the brine $A_{32}$ is returned back to the first step and mixed with the raw brine A to prepare high-magnesium brine $A_0$.

(4) The chlorine salt of solid alkali metal or ammonium obtained in step (3) is prepared into a solution, and mixed with the magnesium washing precipitate B11 obtained in step (2) to obtain magnesium phosphate double salt; the magnesium phosphate double salt obtained in this step is used as the magnesium removing agent in step (1), and the steps (1) to (4) are cycled to realize preparation of low-magnesium lithium-rich brine $A_4$ with a magnesium removing agent regeneration method.

For example, the obtained solid ammonium chloride can be prepared into saturated ammonium chloride solution, magnesium precipitate B11 is added into saturated ammonium chloride solution for reaction, a reaction temperature is 5-30° C., stirring is carried out for 0.5-3 h, and solid-liquid separation is conducted to obtain ammonium magnesium phosphate and regeneration solution $A_5$; the regeneration solution $A_5$ is circularly introduced into brine $A_3$ of step (3) for evaporation and concentration until the ratio of magnesium to lithium in the obtained low-magnesium lithium-rich brine $A_4$ is less than 2 and the concentration of $Li^+$ is within the range of 10 g/L-30 g/L, the comprehensive recovery of lithium in the whole preparation process can be controlled to be 50%-90%.

In order to make the purpose, technical solution and advantages of the embodiment of the present application clearer, the technical solution in the embodiment of the present application will be described clearly and completely below. If the specific conditions are not specified in the embodiment, the conventional conditions or the conditions recommended by the manufacturer shall be followed. The reagents or instruments used without manufacturers are conventional products that can be purchased on the market.

Example 1: 500 g of mixed aqueous solution simultaneously containing magnesium chloride and lithium chloride was taken, in which the concentration of magnesium ions is 40 g/L and the concentration of lithium ions is 1.2 g/L. The magnesium precipitating agent potassium magnesium phosphate hexahydrate was added in four times for total 400 g. After reacting at 50° C. for 4 h, solid-liquid separation was conducted to obtain 450 g of magnesium precipitation solid product and 450 g of product solution, wherein the concentration of magnesium ions was reduced to 6.5 g/L, the concentration of lithium ions was 0.8 g/L, and the concentration of potassium ions was 110 g/L.

Example 2: 500 g of mixed aqueous solution simultaneously containing magnesium chloride and lithium chloride was taken, in which the concentration of magnesium ion is 40 g/L and the concentration of lithium ions was 1.2 g/L, 400 g of magnesium ammonium phosphate hexahydrate was added in four times for total 400 g. After reacting at 80° C. for 4 h, the solid-liquid separation was conducted to obtain 440 g of magnesium precipitation solid product and 460 g of product solution, wherein the concentration of magnesium ions was reduced to 7.1 g/L and the concentration of lithium ions was 1.0 g/L.

Example 3: 500 g of mixed aqueous solution simultaneously containing magnesium chloride and lithium chloride was taken, in which the concentration of magnesium ions was 40 g/L and the concentration of lithium ions was 1.2 g/L. 500 g of magnesium potassium phosphate tetrahydrate was added in four times for total 500 g. After reacting at 30° C. for 4 h, solid-liquid separation was conducted to obtain 448 g of magnesium precipitation solid products and 550 g product solution. The concentration of magnesium ions was reduced to 5.9 g/L and the concentration of lithium ions was 0.83 g/L.

Example 4: 500 g of mixed aqueous solution simultaneously containing magnesium chloride and lithium chloride was taken, in which the concentration of magnesium ions was 40 g/L, the concentration of lithium ions was 1.2 g/L, magnesium precipitation agent sodium magnesium ammonium tetrahydrate was added in four times for total 500 g. After reacting at 90° C. for 4 h, solid-liquid separation was conducted to obtain 622 g of magnesium precipitation solid product and 470 g of product solution, wherein the concentration of magnesium ions was reduced to 10.2 g/L, and the concentration of lithium ions was 0.76 g/L.

Example 5: 330 g of water in 450 g of the product solution obtained in example 1 was evaporated at 20° C. to obtain 74 g of potassium chloride solid, and 41 g of brine was remained, wherein the concentration of magnesium ions was 57 g/L, the concentration of lithium ions was 7 g/L and the concentration of potassium ions was 17 g/L.

Example 6: 440 g of magnesium precipitation solid product obtained in example 2 was added into 500 g of saturated ammonium chloride regeneration solution to react at 20° C., so as to realize the regeneration of the magnesium precipitant. 420 g of magnesium ammonium phosphate was yielded and 516 g of regeneration solution was remained.

Example 7: 4000 g of the product solution obtained from example 1 was repeatedly used. After the treatment process described in example 5, and the remaining brine was 400 g. 420 g of regenerated magnesium precipitant obtained from example 6 was added into the remaining brine to be strongly stirred and reacted for 2 h at 70° C., solid-liquid separation was conducted to obtain 450 g of magnesium precipitation solid product and remain 355 g of brine. In the remaining brine, the concentration of magnesium ions was 17 g/L, the concentration of lithium ions was 6.4 g/L, and the concentration of ammonium ions was 69 g/L.

Example 8: 130 g of water in 355 g of remaining brine obtained in Example 7 was evaporated at 25° C. to precipitate out 53 g of ammonium chloride, and then 50 g of water was continued to be evaporated to precipitate out 55 g of ammonium carnallite, and 60 g of remaining brine was obtained in which the concentration of magnesium ions was 34 g/L, the concentration of lithium ions was 30 g/L, and the weight ratio of magnesium to lithium was 1.13.

Example 9: under the same conditions as that in example 1, when the crystal form control agent $MgHPO_4.3H_2O$ whose weight was 10% of the weight of the magnesium precipitation agent was added, the entrainment rate of mother liquor in the magnesium precipitation solid product was reduced from more than 40 wt % without the addition of crystal form control agent to 16 wt %.

In addition, under the same conditions as in example 1, the crystal form control agent $Mg_3(PO_4)_2.8H_2O$ or $Mg_3(PO_4)_2.22H_2O$ was added, and the amount of the crystal form control agent is 5% and 30% of the total mass of the magnesium precipitation agent and the crystal form control agent, and the entrainment rates of mother liquor in the magnesium precipitation solid product were reduced to 20% and 15% respectively.

Example 10: 450 g of magnesium precipitation solid product obtained in example 1 was washed using 300 g water for three times to obtain 354 g of washing solution in which in three times to obtain 354 g of washing solution, in which the concentration of magnesium ions was 18 g/L and the concentration of lithium ions was 0.55 g/L.

Example 11: the brine beach of a salt lake was dried to form old brine A, which is composed of 1.27 g/L $Li^+$, 3.163 g/L $Na^+$, 1.218 g/L $K^+$, 77.115 g/L $Mg^{2+}$, 8.98 g/L $SO_4^{2-}$, 3.83 g/L B and 224.52 g/L $Cl^-$. 250 g of old brine A was diluted with 500 g of fresh water, and then 300 g of magnesium ammonium phosphate hexahydrate was added. After reaction at 50° C. for 2 hours, solid-liquid separation was conducted to obtain 430 g of magnesium precipitation solid products and 616 g of product brine B, wherein the concentration of magnesium ions was reduced to 9 g/L, the concentration of lithium ions was 0.35 g/L, and the concentration of ammonium ions was 33 g/L. At this time, the weight ratio of Mg to Li in brine was decreased from 62 to 25.

Example 12: 400 g of water in product brine B in example 11 was evaporated at room temperature until the concentration of magnesium ions was 26.5 g/L, then 90 g of magnesium precipitation agent magnesium ammonium phosphate hexahydrate was added to react at 60° C. for 2 h, and then solid-liquid separation was conducted to obtain 132 g of magnesium precipitation solid product and 175 g of product brine C, wherein the concentration of magnesium ions was reduced to 8.7 g/L and the concentration of lithium ions was 1 g/L. At this time, the weight ratio of Mg to Li in brine was reduced from 25 to 9.

Example 13: 80 g of water in brine C obtained in example 12 was evaporated at room temperature until the concentration of magnesium ions was 31 g/L, 41 g of a mixture of ammonium chloride and ammonium carnallite was precipitated out, and then 22 g of magnesium precipitation agent magnesium ammonium phosphate hexahydrate was added to react at 60° C. for 2 h, and then solid-liquid separation was conducted to obtain 35 g of magnesium precipitation solid product and 35 g of brine D, wherein the concentration of magnesium ions was reduced to 10 g/L, and the concentration of lithium ions was 6 g/L. At this time, the weight ratio of Mg to Li in brine was decreased from 9 to 1.6.

Example 14: the magnesium precipitation products (590 g in total) obtained from examples 11 to 13 were stirred with 800 g of $NH_4Cl$ saturated solution at room temperature for 3 h, and then the solid-liquid separation was conducted to obtain 500 g of regenerated magnesium precipitation agent. Then, 300 g of fresh water was used to wash the regenerated magnesium precipitation agent for five times, and 430 g of dry magnesium precipitation agent was obtained after filter pressing.

In addition, the inventor of the present invention also conducted experiments with other raw materials and process conditions listed in the specification with reference to examples 1 to 14. The results show that by virtue of the method provided by the embodiment of the present application, preparation of low-magnesium lithium-rich brine can be efficiently and low-cost realized.

It should be understood that the above description is only a preferred embodiment of the present application and is not intended to limit the present application. Any modifications, equivalent replacements and improvements made within the spirit and principles of the present application shall be included in the scope of protection of the present application.

What is claimed is:

1. A method for using a magnesium phosphate-containing double salt as a magnesium removing agent, wherein the magnesium phosphate-containing double salt comprises one or more selected from the group consisting of ammonium magnesium phosphate, potassium magnesium phosphate and sodium magnesium phosphate, and the method comprises:

adding the magnesium phosphate-containing double salt into a chloride solution containing an $Mg^{2+}$ concentration of ≥10 g/L, to form a mixed reaction product comprising a solid-phase material and a liquid-phase material, wherein the solid phase material comprises a solid-phase reaction product obtained by a magnesium removing reaction between at least a portion of $Mg^{+2}$ and the magnesium phosphate-containing double salt;

carrying out a solid-liquid separation on the obtained mixed reaction product after the magnesium removing reaction is ended to separate the solid-phase material from the liquid-phase material, wherein the solid-phase reaction product comprises a magnesium phosphate hydrate, then separating a chloride of the alkali metal or the ammonium from the liquid-phase material; and carrying out a regeneration reaction by reacting the solid-phase reaction product and the chloride of the alkali metal or of the ammonium, wherein the alkali metal is selected from Na and/or K, to produce new magnesium phosphate-containing double salt.

2. The method according to claim 1, wherein the magnesium phosphate-containing double salt and a crystal form control agent are cooperatively used, wherein the amount of the crystal form control agent is 5%-30% of a total mass of the magnesium phosphate-containing double salt and the crystal form control agent, and the crystal form control agent comprises $MgHPO_4 \cdot 3H_2O$, $Mg_3(PO_4)_2 \cdot 8H_2O$ or $Mg_3(PO_4)_2 \cdot 22H_2O$.

3. The method according to claim 1, wherein the temperature of the magnesium removing reaction is 30-90° C.

4. The method according to claim 1, wherein the weight ratio of the magnesium phosphate-containing double salt to the chloride solution is 0.1:1-1:1.

5. The method according to claim 1, wherein the solid-phase material further comprises unreacted magnesium phosphate-containing double salt.

6. The method according to claim 1, wherein in the step of carrying out the regeneration reaction, a saturated solution of the chloride salt of the alkali metal or the ammonium is used.

7. The method according to claim 1, wherein the temperature of the regeneration reaction is 0-25° C.

8. A method for removing Mg from a brine, comprising:
providing a first solution, which is a brine from a salt lake, wherein the first solution is a chloride solution, and the first solution at least contains $Mg^{2+}$ and $Li^+$;
adding a magnesium removing agent into the first solution, wherein the magnesium removing agent comprises a magnesium phosphate-containing double salt of one or more selected from the group consisting of ammonium magnesium phosphate, potassium magnesium phosphate, sodium potassium magnesium phosphate and sodium ammonium magnesium phosphate to produce a mixed reaction product comprising a solid-phase material and a liquid phase material, wherein the solid-phase material comprises a solid-phase reaction product obtained from a magnesium removing reaction between at least a portion of $Mg^{2+}$ and the magnesium phosphate-containing double salt;
carrying out a solid-liquid separation on the obtained mixed reaction product after the magnesium removing reaction is ended;
obtaining the solid-phase material and the liquid-phase material after the solid-liquid separation is finished, wherein the solid-phase reaction product comprises a magnesium phosphate hydrate, and the liquid-phase material is a second solution; and separating the chloride of the alkali metal or of the ammonium from the second solution; and
carrying out a regeneration reaction by reacting the solid-phase reaction product and the chloride of the alkali metal or of the ammonium, wherein the alkali metal is selected from Na and/or K, to produce new magnesium phosphate-containing double salt.

9. The method according to claim 8, comprising:
cooperatively using the magnesium phosphate-containing double salt and a crystal form control agent, wherein the amount of the crystal form control agent is 5%-30% of a total mass of the magnesium phosphate-containing double salt and the crystal form control agent, and the crystal form control agent comprises $MgHPO_4 \cdot 3H_2O$, $Mg_3(PO_4)_2 \cdot 8H_2O$ or $Mg_3(PO_4)_2 \cdot 22H_2O$.

10. The method according to claim 8, wherein the temperature of the regeneration reaction is 0-25° C.

11. The method according to claim 8, wherein the step of separating the chloride salt of the alkali metal or the ammonium from the second solution further comprises:
evaporating the second solution after the solid-liquid separation is finished so that the chloride of the alkali metal or of the ammonium is precipitated out and a third solution is obtained; and
continuing to evaporate the third solution so that a carnallite in the third solution is precipitated out and a fourth solution is obtained to achieve a removal of magnesium and an enrichment of lithium.

12. The method according to claim 11, wherein the second solution further comprises a used washing liquid obtained by washing the solid phase material with a washing liquid once or multiple times after the solid-liquid separation is finished, wherein the washing liquid comprises freshwater or diluted brine.

13. The method according to claim 12, wherein the weight ratio of the washing liquid to the solid-phase material is 5:1-1:1, and a washing temperature is 0-90° C.

14. The method according to claim 11, further comprising:
adding the magnesium phosphate-containing double salt to the fourth solution to form a second mixed reaction product comprising a second solid-phase material and a second liquid-phase material, wherein the second solid phase material comprises a second solid-phase reaction product obtained by a second magnesium removing reaction between at least a second portion of $Mg^{2+}$ and the magnesium phosphate-containing double salt; and
carrying out a second solid-liquid separation on the second obtained mixed reaction product after the second magnesium removing reaction is ended so as to obtain the second solid-phase material and the second liquid phase, to further achieve the removal of the magnesium and the enrichment of the lithium, wherein the second liquid phase is a fifth solution.

15. The method according to claim 8, wherein the temperature of the second magnesium removing reaction is 30-90° C.

16. The method according to claim 8, wherein the weight ratio of the magnesium phosphate-containing double salt to the chloride solution is 0.1:1-1:1.

17. The method according to claim 8, wherein in the chloride solution, the concentration of $Mg^{2+}$ is ≥10 g/L, the concentration of $Li^+$ is ≥0.3 g/L, and the concentration of $Ca^{2+}$ is 1 g/L.

18. The method according to claim 8, further comprising:
pretreating an original brine of the salt lake to form the first solution.

\* \* \* \* \*